Sept. 1, 1953        J. G. OETZEL        2,650,682
ELECTROMAGNETIC FRICTION DEVICE
Filed Jan. 19, 1949
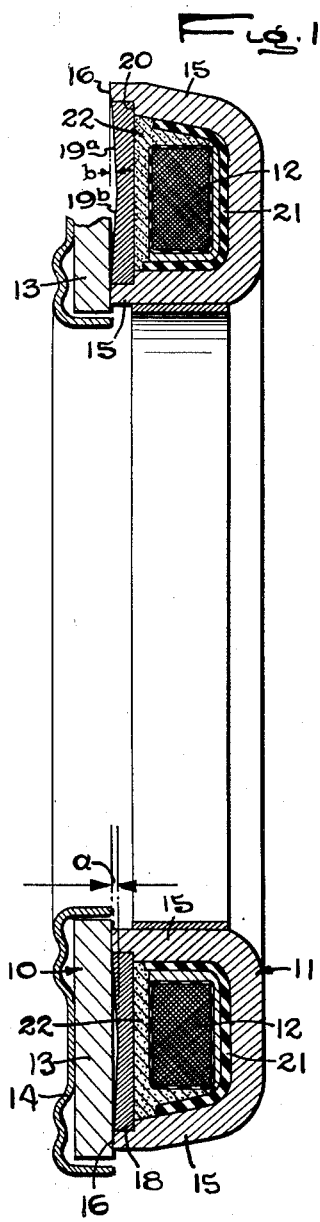
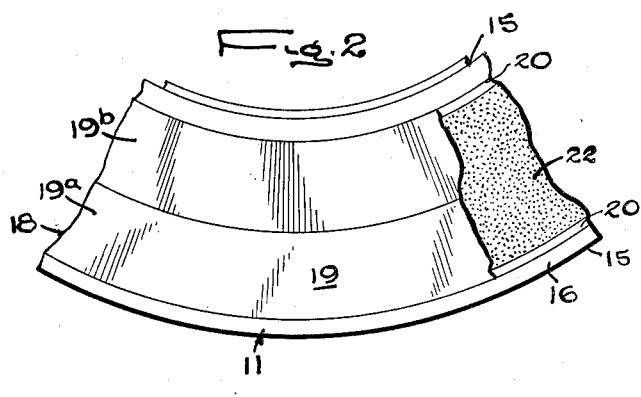
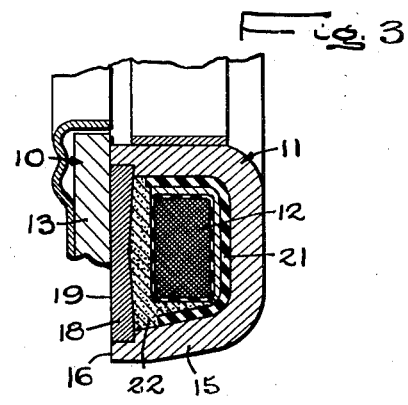
INVENTOR
John George Oetzel
By Cullen, Pitzner, Hassard & Wolfe
ATTORNEY Patented Sept. 1, 1953

2,650,682

UNITED STATES PATENT OFFICE 2,650,682

ELECTROMAGNETIC FRICTION DEVICE

John George Oetzel, Beloit, Wis., assignor to Warner Electric Brake & Clutch Company, a corporation of Illinois Application January 19, 1949, Serial No. 71,754

1 Claim. (Cl. 188—164)

This invention relates to electromagnetic friction devices of the type comprising a magnet ring having an annular winding disposed between and extending around spaced magnetic pole pieces whose end faces are drawn into gripping engagement with an armature when the winding is energized, the magnet pole pieces supporting a wear resistant member having a friction face engageable with the armature and disposed substantially flush with the pole faces.

When a magnetic friction device of the above character is subjected to prolonged energization when first put into service, the device fails to develop its full rated torque. I have discovered that this difficulty is due to outward bulging of the friction face of the wear member which in turn is caused by differential thermal expansion of the rigid magnet ring on the one hand and the winding and its associated insulation on the other hand. The pole faces are thus separated from the armature thereby resulting in a relatively high reluctance of the magnetic circuit and failure to develop the full attractive force of the magnet.

The primary object of the present invention is to overcome the difficulty above mentioned and provide a magnet which develops a uniform frictional torque during its initial service use irrespective of the duration of the initial energization.

A more detailed object is to undercut the friction face of the wear member on the magnet to a depth sufficient to avoid separation of the armature and pole faces during initial energization of the magnet.

Another object is to form the wear member with a friction face which at its side edges is substantially flush with the magnet pole faces and which is dished inwardly below the latter to a maximum depth of a few thousandths of an inch throughout its circumference and over the major portion of its width.

Other objects and advantages of the invention will become apparent from the following detailed description taken in connection with the accompanying drawings, in which Figure 1 is a fragmentary diametrical cross section of an electromagnetic friction device embodying the novel features of the present invention, certain of the dimensions being exaggerated.

Fig. 2 is a fragmentary view of the magnet face.

Fig. 3 is a view of a part of Fig. 1 showing the relation of the parts after heating in initial service use.

For purposes of illustration, the invention is shown in the drawings embodied in an electromagnetic clutch or brake having coaxially arranged armature and magnet rings 10 and 11 adapted to be brought into axial gripping engagement upon energization of a multiple turn annular winding 12 secured in the magnet ring. The armature may as shown comprise a series of segments 13 of magnetic material arranged end to end in an annular series and secured to a backing plate 14 by which the exposed flat faces of the segments are held in a common plane.

The magnet ring is formed of magnetic material and of U-shaped cross section and has concentric pole pieces 15 radially spaced apart to correspond to the width of the armature and terminating in end faces 16 which are substantially flush with each other and lie in a common plane. To reduce the wear on the pole faces during this gripping engagement with the armature while the two rings are rotating relative to each other, an annular member 18 composed of nonmetallic friction material such as brake lining is supported by the magnetic ring and provides an exposed friction face 19 substantially flush with the pole faces 16. Herein, the wear member extends around the full circumference of the magnet and spans the space between the inner and outer pole pieces 15 which are undercut to provide shoulders 20 on which the inner and outer edge portions of the member are seated.

The winding 12 substantially fills the space between the pole pieces and is seated on a U-shaped insulating separator 21 pressed into the magnet between the poles. Locking of the winding securely in the magnet ring may be effected by filling the remaining space with an insulating material 22 such as sand containing a bonding agent which when baked and held under pressure forms a solid and rigid backing for the wear member 18. Preferably, the latter is pressed into place before the baking operation.

In accordance with the present invention, the exposed face 19 of the wear member 18 is machined and undercut or dished radially, as indicated at 19a and 19b, preferably over its full width and to a depth indicated on an exaggerated scale at $a$ and being on the order of a few thousandths of an inch, for example, .005–.008. Preferably, the maximum depth is located about midway between the magnet poles and the undercutting decreases gradually both inwardly and outwardly to the edges of the friction face 19 which edges merge and are substantially flush with the pole faces 16.

While the undercut surfaces may be of various contours, they are conical in the present instance and taper not only across the inner and outer portions of the wear member 18 but also across the pole faces 16 themselves. Such undercutting may be effected conveniently in a turning operation and is facilitated by machining the full width of the magnet face at conical angles b on the order of three-fourths of a degree.

When the magnet constructed as described above is put into actual service in a magnetic friction clutch or brake and is energized for a prolonged period with the magnets and armature slipping relative to each other, the temperature of the magnet is increased substantially due mainly to the heat generated at the engaging friction faces. This heat results in expansion of the coil 12 and the backing 22 which, being confined by the rigid magnet ring, can increase in only one dimension, that is, axially. This bends the wear member 18 outwardly gradually as shown in Fig. 3 and the resulting bulging flattens the friction face 19 so as to bring substantially the entire area of the latter into engagement with the armature surface. It will be observed that during this bulging, the pole faces 16 remain in full contact with the armature face thereby avoiding any reduction in the attractive force developed by the magnet.

The term "machined" as used herein with reference to the exposed friction face 19 of the wear plate 18 contemplates a surface formed by a cutting or grinding tool as contrasted with the worn surface which results in service use of the magnet by frictional rubbing under pressure with the coacting friction element or armature 10.

I claim as my invention:

In a friction torque producing device having relatively rotatable magnetic rings adapted for axial gripping engagement, a magnet including rings of magnetic material concentric with each other and terminating at their ends in annular pole faces lying substantially in a common plane normal to the axis of the rings, and a member composed of non-magnetic material of greater wear resistance than said pole faces spanning and rigidly supported by said rings and having a machined surface substantially flush with said pole faces, said machined surface being undercut below said plane and sloping progressively inwardly and outwardly respectively from the outer and inner pole faces to a maximum depth intermediate said faces of a few thousandths of an inch whereby to impart to the surface before service use of the magnet a dished contour approximating that resulting from frictional wear and heating in actual service.

JOHN GEORGE OETZEL.

References Cited in the file of this patent

UNITED STATES PATENTS

| Number | Name | Date |
|---|---|---|
| 794,086 | Eastward | July 4, 1905 |
| 807,517 | Vance | Dec. 19, 1905 |
| 906,599 | Ahlm | Dec. 15, 1908 |
| 2,095,499 | Hodgsen et al. | Oct. 12, 1937 |
| 2,106,717 | Cadman | Feb. 1, 1938 |
| 2,353,750 | Oetzel | July 18, 1944 |
| 2,378,943 | Oetzel | June 26, 1945 |
| 2,421,757 | Oetzel | June 10, 1947 |